United States Patent [19]

Chu

[11] Patent Number: 5,823,852

[45] Date of Patent: Oct. 20, 1998

[54] WATER BAG TYPE BRASSIERE PADDING WITH A VALVE

[76] Inventor: Chia-Hui Chu, 10-3 Fl., 96, Lung An Street, Taoyuan City, Taiwan

[21] Appl. No.: 864,743

[22] Filed: May 29, 1997

[51] Int. Cl.⁶ .............................. A41C 3/00; A41C 3/12; A41C 5/00; A41D 27/00
[52] U.S. Cl. .................................. 450/38; 450/57; 450/93; 2/267; 137/844; 137/847; 623/7
[58] Field of Search .......................... 2/267, 268, DIG. 3, 2/DIG. 10, 463; 623/7, 8, 11, 12; 450/38, 53, 54, 55, 56, 57, 92, 93, 30, 31, 32; 137/844, 847; 251/149.1; 604/411, 415

[56] References Cited

U.S. PATENT DOCUMENTS

| 292,829 | 2/1884 | Ledochowski | 450/38 |
|---|---|---|---|
| 2,907,341 | 10/1959 | Boyer et al. | 137/844 |
| 3,837,381 | 9/1974 | Arroyo | 251/149.1 |
| 4,752,287 | 6/1988 | Kurtz et al. | 251/149.1 |

*Primary Examiner*—Jeanette Chapman
*Attorney, Agent, or Firm*—Rosenberg, Klein & Bilker

[57] ABSTRACT

A water bag type brassiere mounted in one cup of a brassiere and having a valve partially projecting to the outside through which the volume of contained fluid in the padding can be adjusted with a syringe, the valve including a rubber valve body and a rubber binding sleeve sleeved onto the rubber valve body, the valve body having longitudinal center hole at its heat outside the padding, and a split forced to close by the binding sleeve, the split being opened to let fluid pass when a needle of a syringe is inserted into the longitudinal center hole of the valve body.

1 Claim, 7 Drawing Sheets

WATER BAG TYPE BRASSIERE PADDING WITH A VALVE

BACKGROUND OF THE INVENTION

The present invention relates to water bag type brassiere paddings, and more specifically to such a water bag type brassiere padding which has a valve through which the volume of contained fluid can be adjusted with a syringe.

Regular brassieres are commonly stuffed with sponge or silicon rubber paddings in its cups for supporting the breasts. Recently, water bag type brassiere paddings are intensively used for this purpose for the advantage of being capable of synchronizing with the oscillation of the breast. As illustrated in FIGS. 1 and 2, the cup (a) of the brassiere is mounted with a water bag type brassiere padding (b). When the brassiere is put on the body, the water bag type brassiere padding (b) is disposed right below the breast (d), and therefore the breast (d) is well supported. This structure of water bag type brassiere padding (b) is comprised of two symmetrical, flexible, watertight, dish-like panels fastened together by a high-frequency heat sealing apparatus. When the two dish-like panels are sealed together to form a water bag with a filling hole, a fluid is filled into it, and then the filling hole is sealed by heat sealing. Because the fluid volume is not adjustable when the brassiere padding is made, it cannot fit different sizes of brassieres. Further, because the two water bag type brassiere paddings of the two cups contain a same volume of liquid when the brassiere is made and the user's two breasts may have different sizes, the brassiere paddings cannot fit individual needs.

SUMMARY OF THE INVENTION

The present invention has been accomplished to provide a water bag type brassiere padding which eliminates the aforesaid drawbacks. It is one object of the present invention to provide a water bag type brassiere padding which is comfortable in use. IT is another object of the present invention to provide a water bag type brassiere padding which can be conveniently adjusted to fit the size of the breast. According to one embodiment of the present invention, the water bag type brassiere padding is comprised of two symmetrical, flexible, watertight, dish-like panels peripherally sealed together to hold a fluid in a water chamber defined therein, and a valve sealed to the sealing edge of the dish-like panel at the border through which the volume of the fluid contained in the water bag type brassiere padding can be adjusted with a syringe. The valve comprises a rubber valve body and a rubber binding sleeve sleeved onto the rubber valve body. The valve body has longitudinal center hole at its heat outside the padding, and a split forced to close by the binding sleeve. The split is opened to let fluid pass when a needle of a syringe is inserted into the longitudinal center hole of the valve body. When the needle of the syringe is removed from the valve body, the split is closed again.

DETAILED DESCRIPTION OF THE PREFERRED EMBODIMENT

Figure 1:
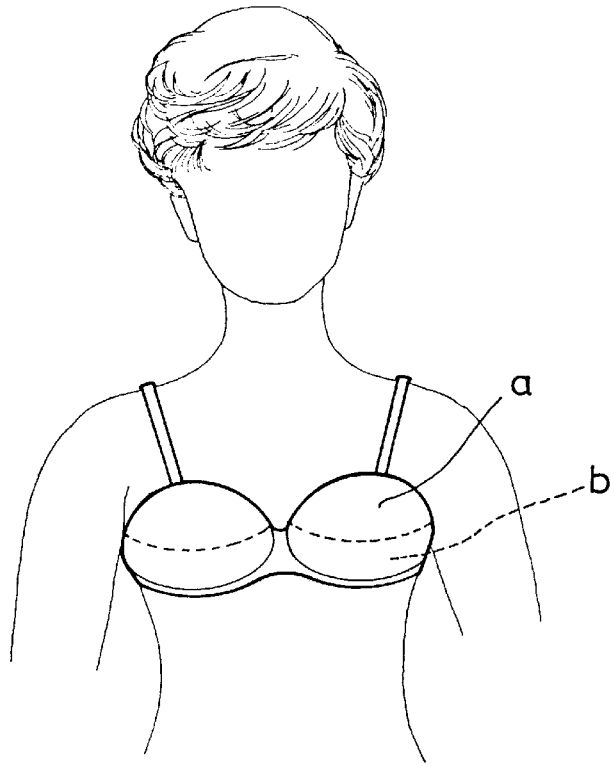
FIG. 1 is a schematic drawing showing a water bag type brassiere padding installed in each cup of a brassiere according to the prior art.
Figure 2:
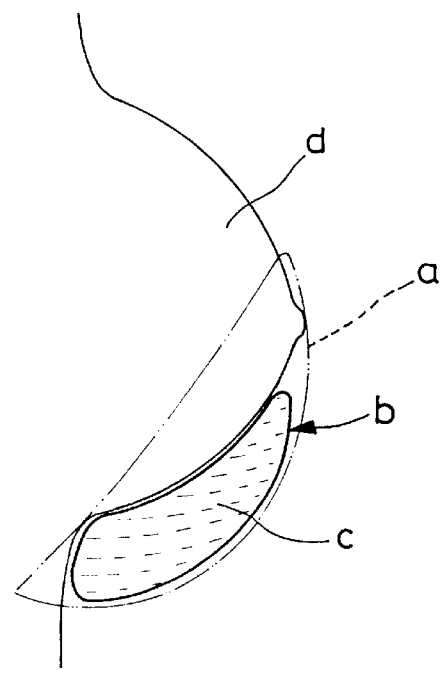
FIG. 2 is a side view in an enlarged scale of a part of FIG. 1, showing the breast supported on the brassiere padding.

Referring to FIGS. from 3 and 4, a padding 2 is mounted in each cup 1L; 1R of a brassiere 1. The padding 2 is water bag comprised of two symmetrical, flexible, watertight, dish-like panels 21 having a respective peripheral sealing edge 22 fastened together by heat sealing, and a valve 3 sealed to the padding 2 in between the sealing edges 22 of the panels 21.

Figure 5:
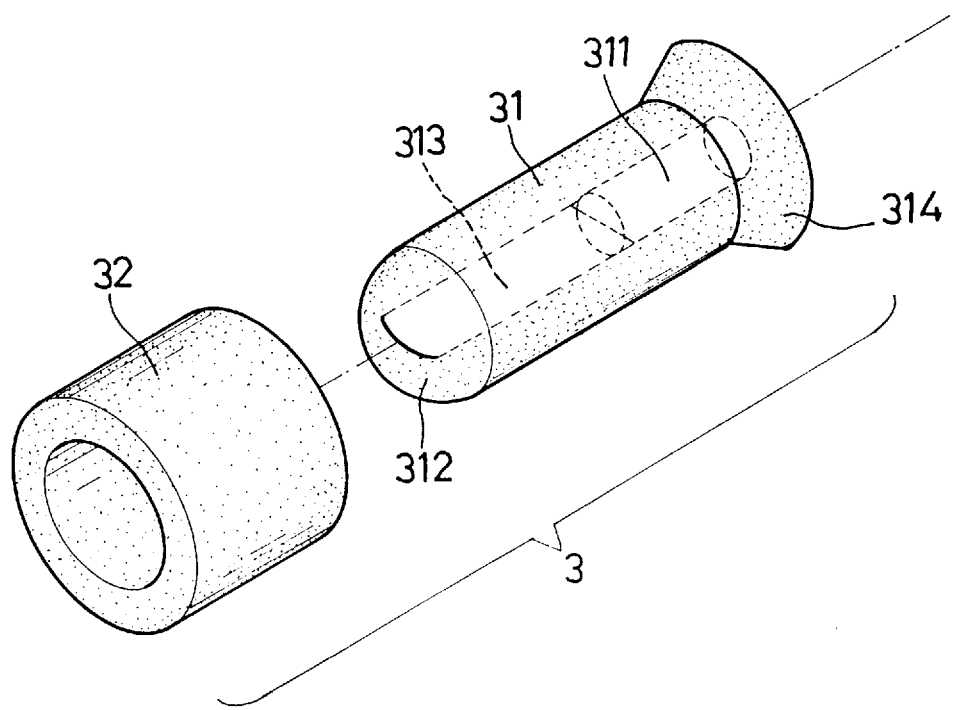
FIG. 5 is a perspective exploded view in an enlarged scale of the valve shown in FIG. 4.
Figure 6:
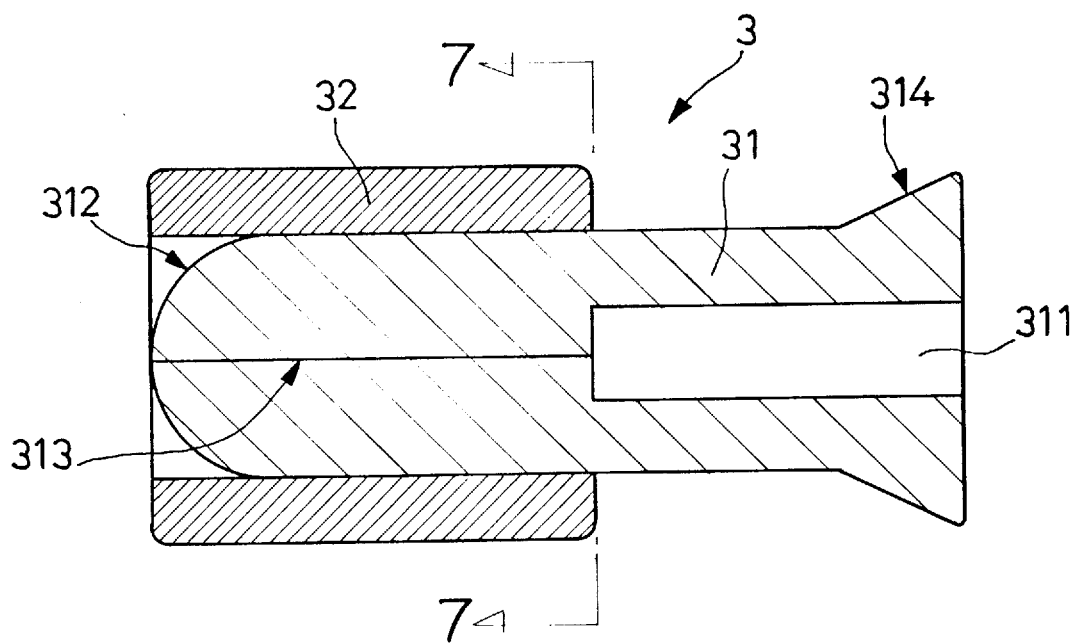
FIG. 6 is a longitudinal in section in an enlarged scale of the valve shown in FIG. 4.
Figure 7:
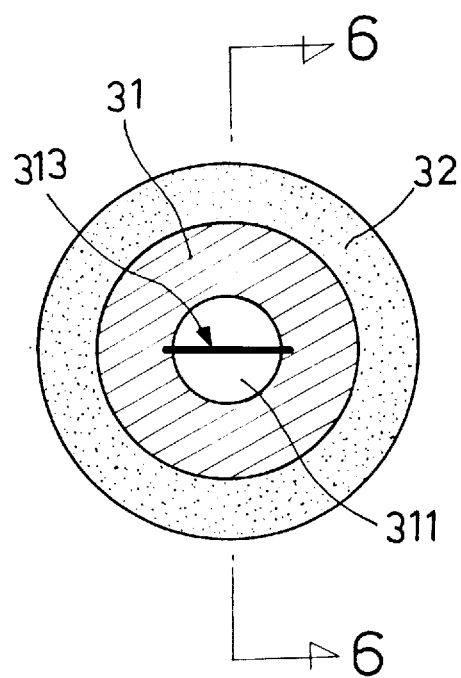
FIG. 7 is a sectional view taken along line 7—7 of FIG. 6.

Referring to FIGS. 5, 6 and 7, the valve 3 comprises a cylindrical valve body 31 and a binding sleeve 32 respectively made from elastic material for example rubber. The cylindrical valve body 31 comprises a countersunk head 314, a longitudinal center hole 311 extended from the center of the countersunk head 314 to a certain depth, and a longitudinal split 312 transversely cut through the diameter and extended from the longitudinal center hole 311 to its end 312. The binding sleeve 32 is sleeved onto the valve body 31 to impart an inward compressive force, causing the split 313 to be closed.

Figure 3:
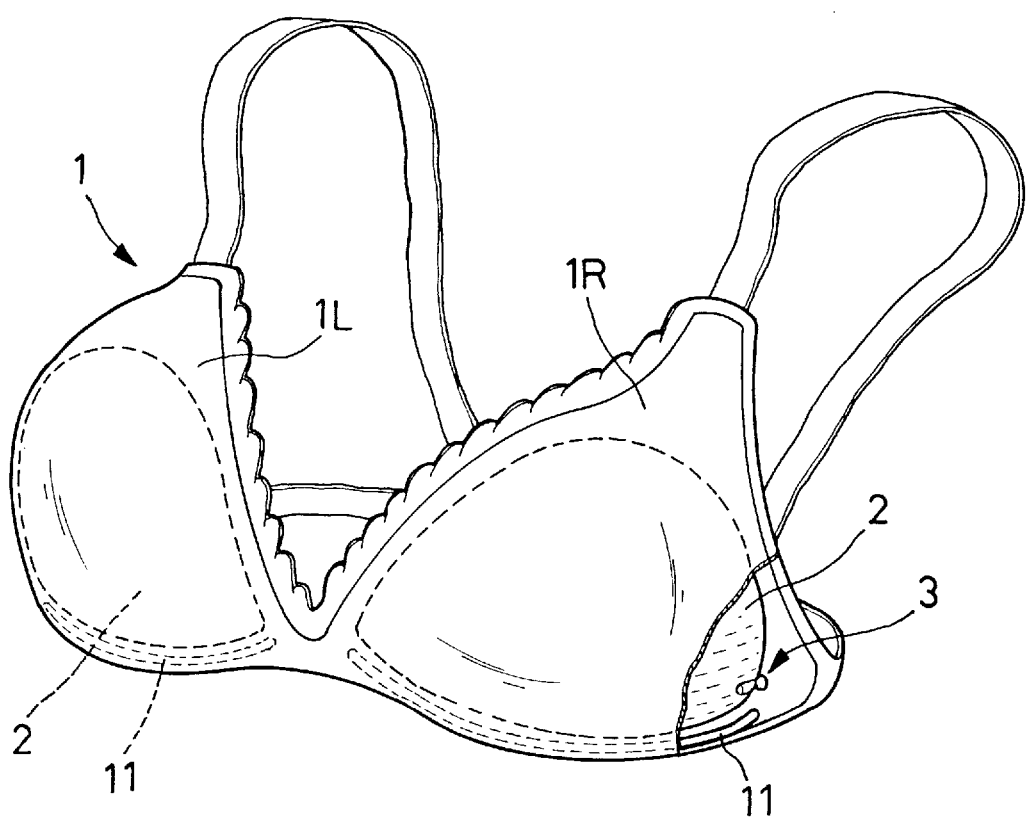
FIG. 3 is a cutaway of a brassiere made according to the present invention.
Figure 4:
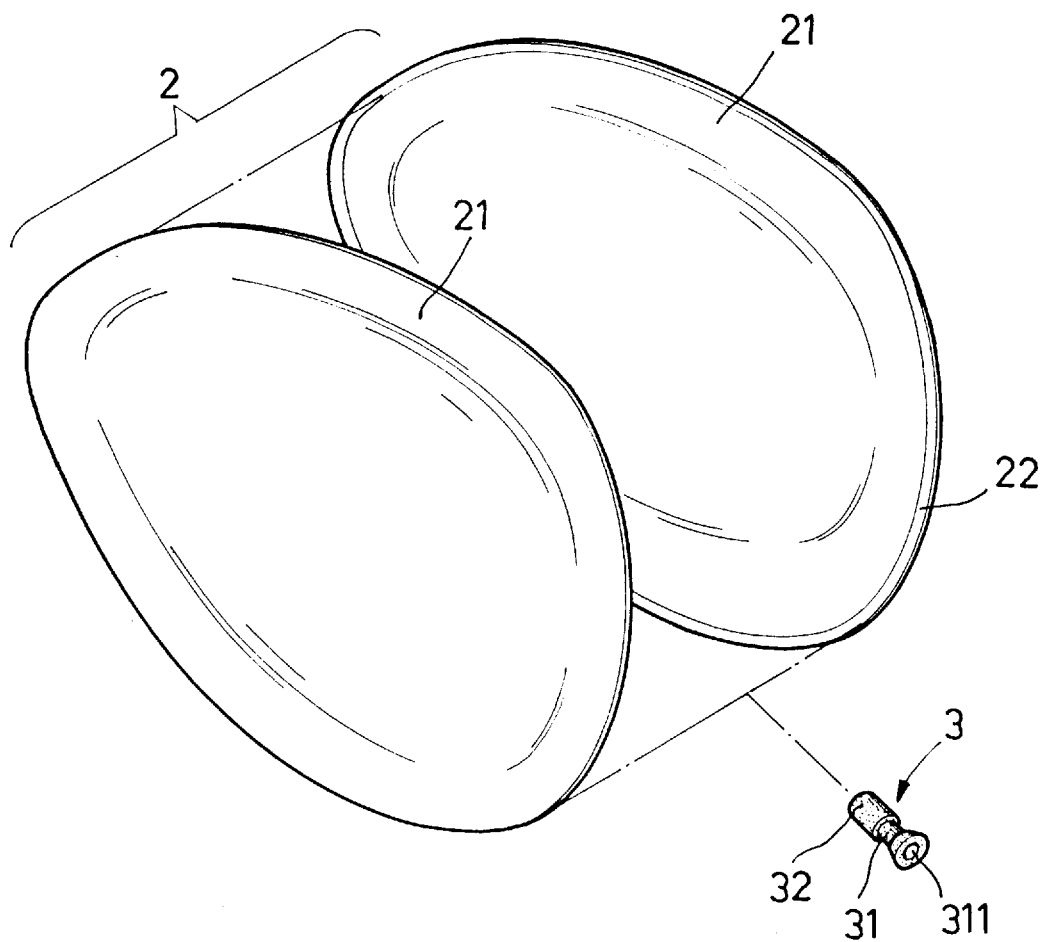
FIG. 4 is an exploded view of a water bag type brassiere padding according to the present invention.
Figure 8:
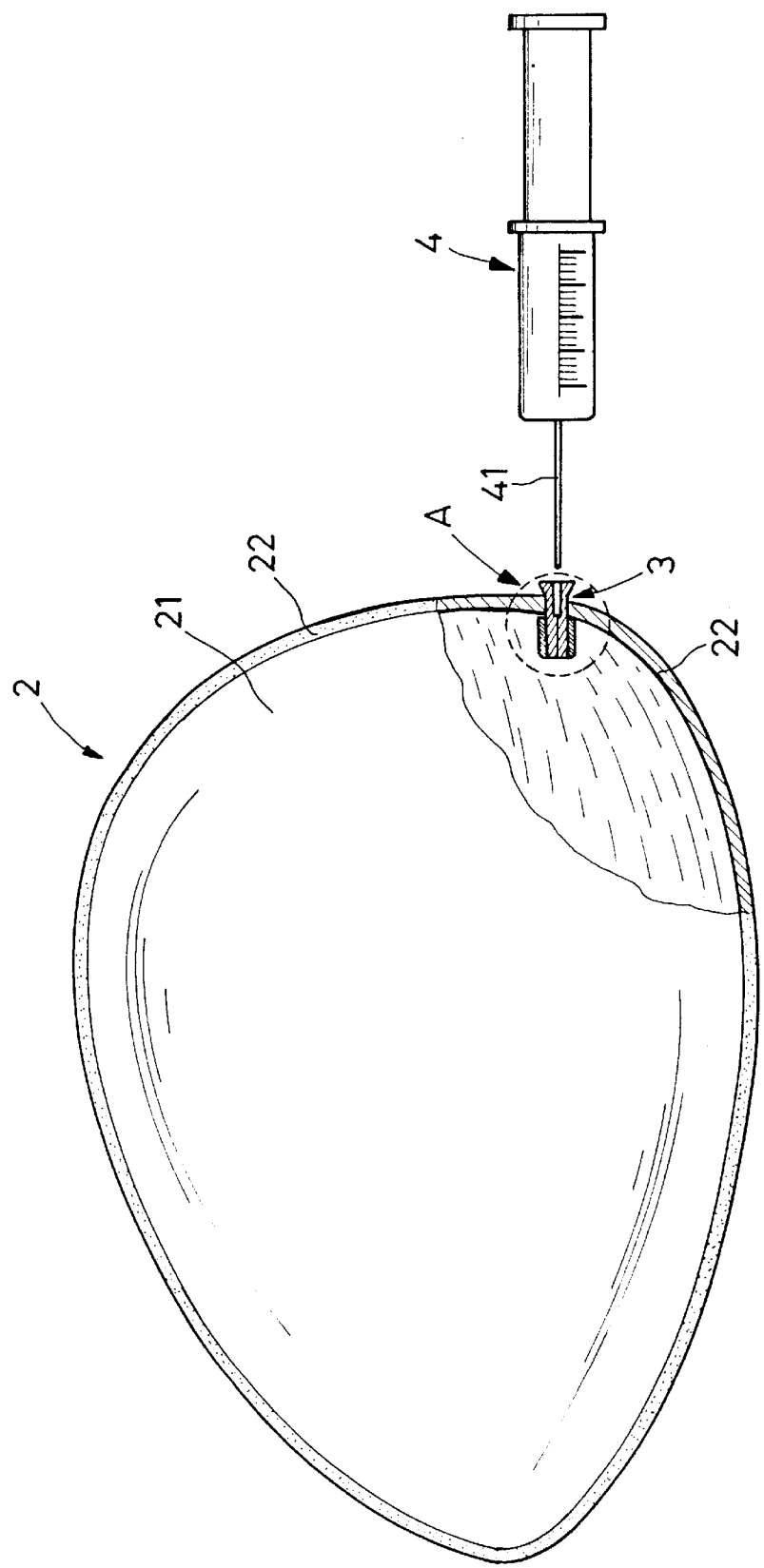
FIG. 8 is a cutaway view of the padding according to the present invention.
Figure 9:
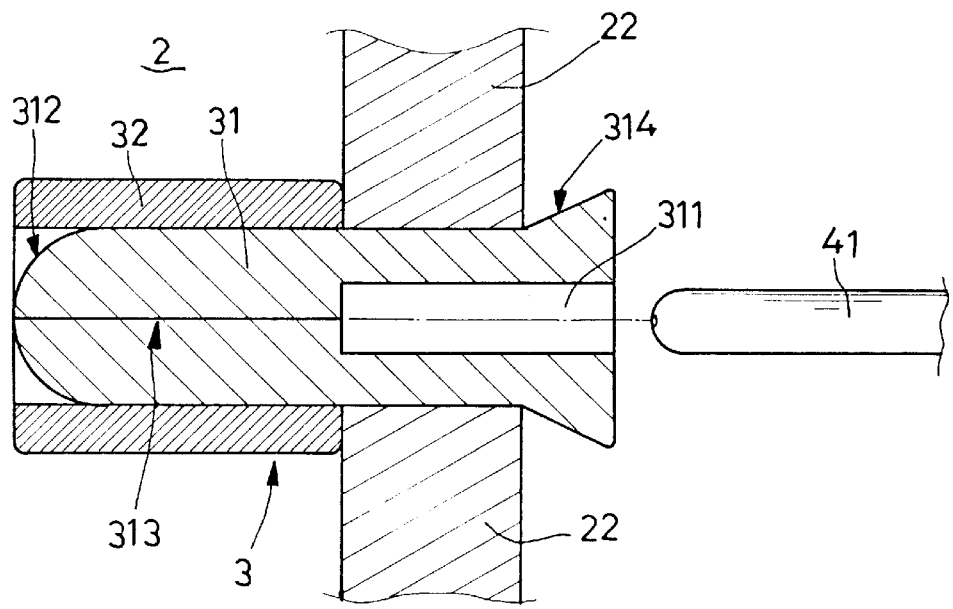
FIG. 9 is a sectional view in an enlarged scale of a part of the present invention, showing the needle removed from the valve body, and the split of the valve body closed.
Figure 10:
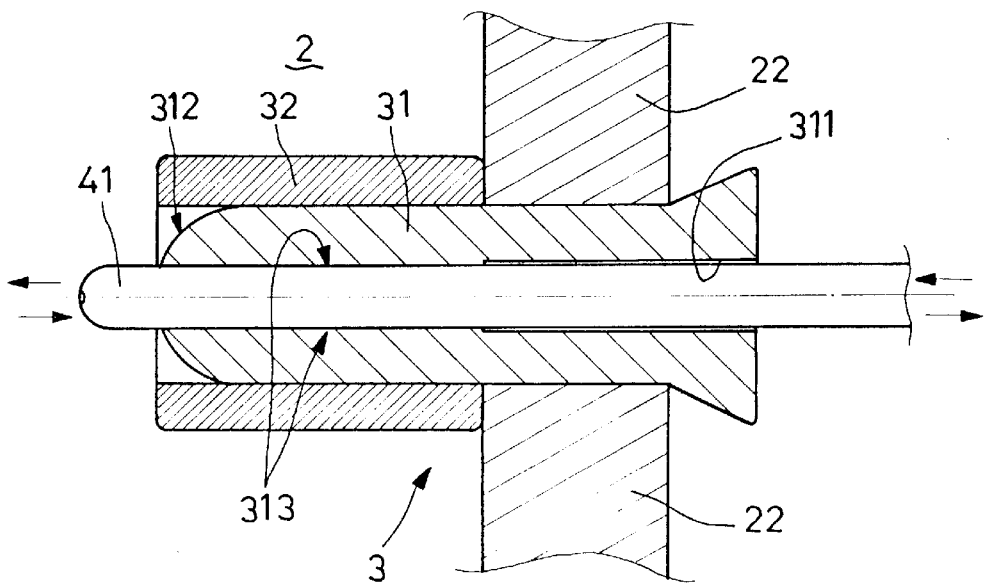
FIG. 10 is similar to FIG. 9 but showing the needle inserted through the longitudinal center hole and longitudinal split of the valve body.

Referring to FIGS. 3 and 4 again, the valve 3 has a length about 15 mm, and a diameter about 6 mm. When installed, most part of the valve 3 is disposed inside the padding 2, and only the countersunk head 314 is disposed outside the sealing edges 22 of the padding 2 (see FIG. 9). The design of the countersunk head 314 makes the countersunk head 314 to be easily sealed to the padding 2 in between the sealing edges 22. Further, the padding 2 is covered within the fabric covering of the cup 1L or 1R. The cup 1L or 1R has an arched steel wire 11 mounted on the inside at the bottom to support its shape. The valve 3 is preferably disposed adjacent to the steel wire 11 convenient for the insertion of a needle 41 of a syringe 4 to fill a fluid into the padding 2 (see FIG. 8).

Referring to FIGS. from 8 to 10, when the needle 41 of the syringe 4 is inserted into the longitudinal center hole 311 and pushed forwards, the split 313 is forced to open and to let the needle 41 pass to the inside space of the padding 2, and therefore a fluid can be driven from the syringe 4 into the inside space of the padding 2, causing the padding 2 to swell. It the volume of the fluid contained in the padding 2 is excessively high, the fluid can be drawn out of the padding 2 by the syringe 4. When the needle 41 of the syringe 4 is removed from the valve 3, the binding sleeve 32 immediately returns to its former shape, therefore causing the split 313 to be closed again.

When to adjust the volume of the fluid, it is unnecessary to remove the padding 2 from the cup 1L or 1R. The user can touch the cup 1L or 1R with the hand and find the location of the valve 3, then hold the valve 3 firmly with one hand and insert the needle 41 of the syringe 4 through the fabric covering of the cup 1L or 1R into the valve body 31 of the valve 3 with the other hand. When the fluid volume is adjusted, the needle 41 of the syringe 4 is removed from the valve 3 and the cup 1L or 1R, and the valve 3 automatically closes its passage. Because two individual paddings 2 are respectively mounted in the cups 1L;1R of the brassiere 1, the two paddings 2 can be adjusted to fit the breasts separately, and the user can freely adjust the volume of the fluid content when desired.

While only one embodiment of the present invention has been shown and described, it will be understood that various modifications and changes could be made thereunto without departing from the spirit and scope of the invention disclosed.

What the invention claimed is:

1. A water bag type brassiere, comprising:

a brassiere having a pair of fabric covered cup portions;

a pair of chambers respectively secured in each said cup portion of said brassiere, each of said chambers being formed by a pair of flexible watertight panels secured each to the other along respective peripheral edges thereof;

a liquid within said chamber;

a valve secured between said pair of panels of each said chamber at a location overlayed by said fabric covering a respective cup portion of said brassiere, said valve having a close state for preventing passage of fluid and an open state for passage of fluid, said valve including (a) a cylindrical valve body having an outer end and an inner end thereof, said valve body having a countersunk head disposed at said outer end thereof and disposed external said pair of panels of a respective chamber for tactile location of said valve through said fabric covering said cup portions of said brassiere, said valve body having a central hole extending longitudinally a predetermined distance from said outer end thereof, said central hole having a bottom, said valve body having a slit extending longitudinally between said bottom of said central hole and said inner end thereof, and (b) a binding sleeve disposed on an external surface of said cylindrical valve body, said binding sleeve imparting a compressive force on said cylindrical valve body to thereby maintain opposing wall portions of said cylindrical valve body as defined by said slit in contiguous contact for maintaining said valve in said closed state and, a syringe having a needle for piercing said fabric covering a respective cup portion of said brassiere for introduction into said central hole, said needle overcoming said compressive force applied to said cylindrical valve body to pass through said slit and adjust a volume of said liquid within said chamber.

* * * * *